Patented Aug. 10, 1937

2,089,875

UNITED STATES PATENT OFFICE 2,089,875

APPARATUS FOR THE AGGLOMERATION OF POWDERS OF SOLID COMBUSTIBLES

Gaston Victor Bruyant, Paris, France, assignor to Société à responsabilité limitée dite: Distillation à Basse Temperature et Auto-Agglomeration des Combustibles, Paris, France Application June 21, 1935, Serial No. 27,774
In France June 27, 1934

7 Claims. (Cl. 25—100)

In Patent No. 2,026,439 of December 31, 1935 is described a process and an apparatus for the agglomeration of powders of combustibles; according to this patent, the fuel, mixed eventually with hydrocarbons, is previously distilled at low temperature up to its point of plasticity, whereupon the substance is displaced, kneaded and compressed with aid of a driving screw across a conical body and finally led into a cell of greater conicity, where this substance is submitted to a final compression and cracking; this cell constituting an open mould was preferably provided on a device comprising a plurality of such cells and displaceable periodically along the mouth piece of the compression body and along of a mechanism arranged to obturate the greater orifice of the mould in its positions between the position of filling and the position of expelling, in such manner that the removal of the mass from the cell was effected after a time only, sufficient for cooling of the mass, without necessitating stopping of the running apparatus.

There was also provided an arrangement for automatically replacing a charged mould by an empty mould as soon as the required pressure has been obtained in the just charged mould.

The present invention consists in an improved form of the apparatus; according to the invention, the moulds or cells are supported by an endless chain advancing intermittently in such manner that the moulds are brought successively to the discharge orifice of the compression trough and are applied against this orifice by a member pressing against the smaller basis of the mould so as to equalize the effort developed by the compression of the substance; during the period of filling of the mould the supporting chain undergoes a short stop of its movement.

Obturating covers are provided for maintaining in the mould the degree of compression of the substance during a time sufficient for permitting the outer layer of the agglomerate of acquiring, by pressure and cooling, a state of solidification capable of resisting to the tension of the occluded gases. These covers are carried by another chain endless and coupled with the first chain carrying the moulds.

The compression and charging screw is actuated electrically; since the absorbed work increases with the degree of compression of the substance, the current consumption by the motor increases up to a predetermined value at which a relay is actuated, arresting the compression and simultaneously controlling a motor advancing the chains, the said obturating member having been previously put aside in order to liberate the charged mould.

The motor ensuring the advance of the chains and the movement of said pressing member may be a compressed air motor with a relay causing an automatic inversion of the admission by a suitable control of the valves.

Finally the liberation of the charged mould is effected by the same motor which ensures the advance of the carrying chains.

The explanations given heretofore will moreover be more readily understood by referring to the accompanying drawings which show, by way of simple example, a particular form of construction of an agglomerating machine in accordance with the invention. On the drawings.

Figure 1:
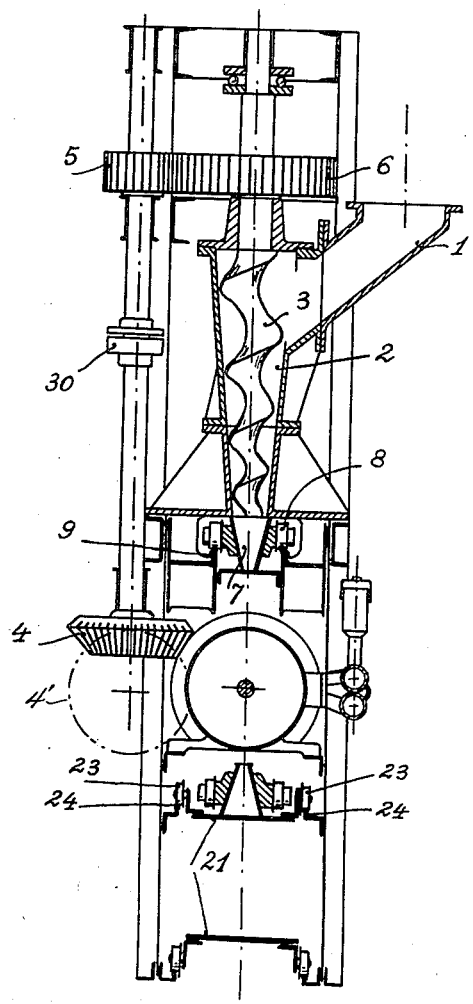
Fig. 1 is a cross section of the apparatus.
Figure 2:
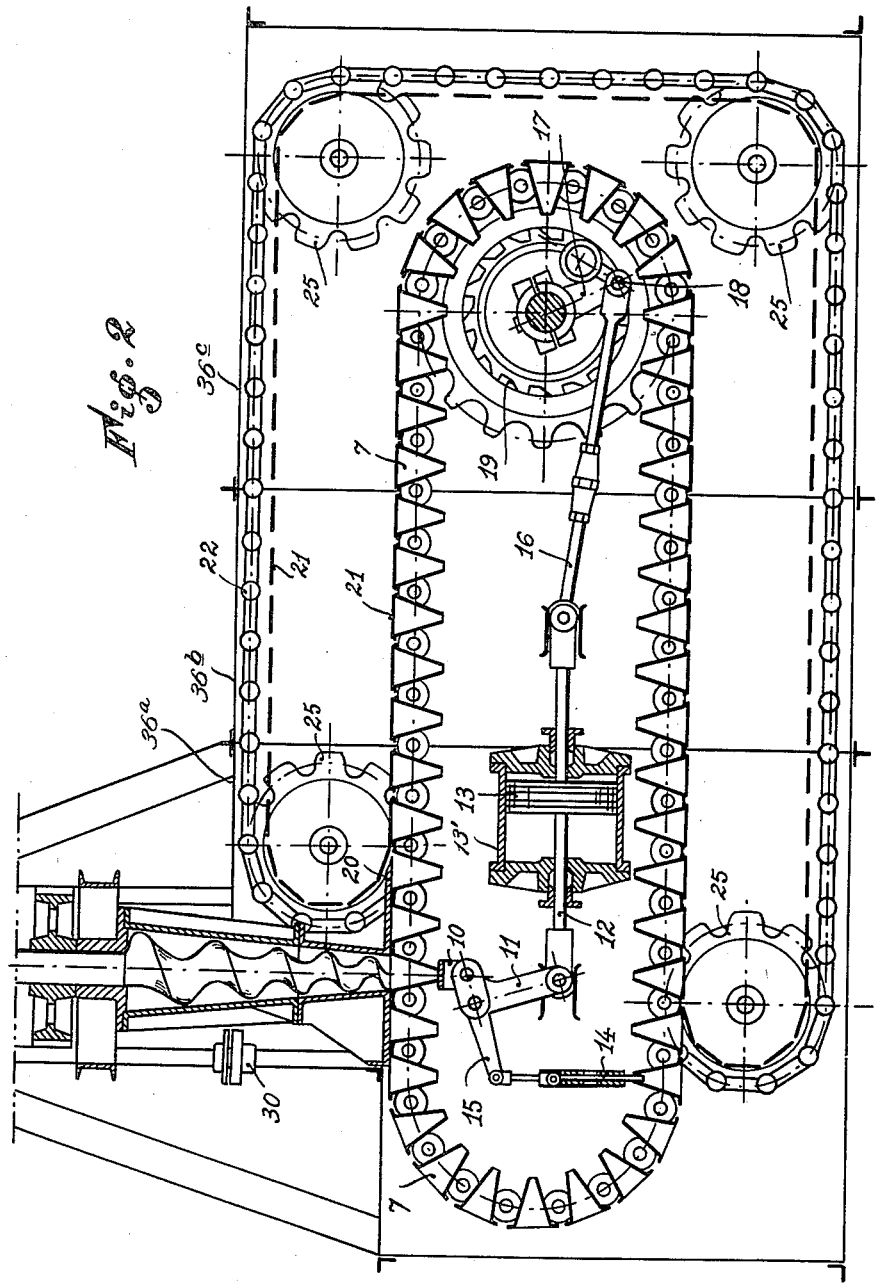
Fig. 2 is a longitudinal section thereof.
Figure 3:
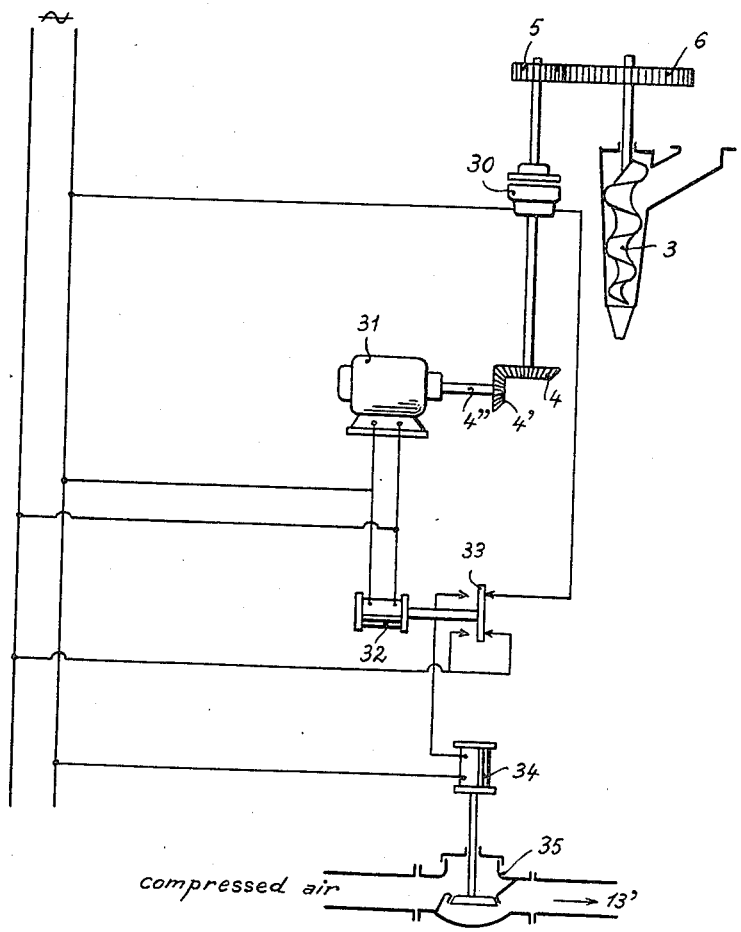
Figure 3 is a diagrammatic showing of the electric motors, relays, etc.

The pasty coal is brought to the machine by the chute 1 connected to the trough 2 enveloping a conical screw 3 having a decreasing pitch. The conical screw is driven with a rotary movement which is transmitted to it by the gear wheels 4, 5, and 6, the wheel 6 being fast on the shaft of the screw 3 and the wheel 4 being driven by a reduction gear from an electric motor not illustrated.

The rotation of the screw 3 drives the coal through the trough 2 and conveys it to the lower orifice thereof at the same time malaxing it and raising its density by progressive compression. The malaxing and reduction in volume which results therefrom have for effect to degasify the mass by liberating the occluded gases of distillation which it carries along with it.

The malaxing moreover produces the coating of the imperfectly distilled particles with the pulp and provides homogeneity of the material to be compressed.

The moulds 7 are successively brought into the locking position at the right of the outlet orifice of the feed trough 2. These moulds, the conical shape of which is preferred, are carried by the rollers 8 and form together an endless chain running on the rails 9. A wad or plug 10 is carried by the connecting rod 11 to which there is applied, through the intermediary of the rod 12 the pneumatic pressure exerted on the piston 13, so that the said plug is strongly pressed against the end of the mould 7 being loaded and ensures its adherence to the outlet orifice of the trough 2 in a perfect manner.

The filling of the mould 7 is obtained owing to the fact that the feed screw 3 continuously rotates at a compression which progressively rises at the same time as the density of the product compressed until the final rate of compression is reached.

The consumption of the electric motor attains a highest predetermined value at which an electric relay is acted upon, this relay having a double purpose:

1. To control the air distribution in the compressed air motor 13 ensuring all operations of the mechanism, and 2. To arrest simultaneously the compression mechanism by means of a magnetic clutch 30.

Under the action of the relay, the piston 13 moves to the left in the position shown on the drawings, and releases the plug 10 which was holding the filled mould against the outlet orifice of the distributing trough.

To allow for this operation without movement of the chain carrying the moulds, the connecting rod 16 actuating the handle 17 carrying the pawl 18 driving the ratchet driving wheel 19, causes the handle 17 to move over an idle course bringing the pawl 18 into its operating position for driving the wheel 19.

During this same displacement of the piston 13, the piston 14 carried by the connecting rod 15 forming part of the connecting rod 11, is released from the empty mould of which it has effected the emptying, and releases the chain carrying the moulds from any restraint to its advance.

The driving of the chain carrying the moulds, in slicing off the material between the outlet orifice of the trough 2 and the loaded mould 7, causes the pressure exerted on the feed screw 3 to fall suddenly and brings about a sudden fall in the consumption of current which releases the relay, causing thereby a re-starting of the compression screw 3. The piston 13 having no longer to overcome anything but a negligible effort, a set of valves cuts off the admission of compressed air and the stroke of the piston 13 continues by expansion.

The completion of this stroke effects the rotation of the ratchet wheel which drives the chain carrying the moulds by an amount such that at the end of the travel one empty mould becomes substituted for the full mould. At this moment a set of valves reverses the admission of air to the piston which is then driven back to the right effecting at the end of this new stroke, a locking of a new mould being filled and the emptying, by means of the piston 14, of the full mould which has now become cooled and solidified to the extent desired.

The displacement of the chain slices off the material loaded into the mould clean with the edge thereof and places the filled mould beneath the lip of the cover 20 which opposes the inflation of the compressed mass still subjected to a certain amount of distillation under the action of the internal heat.

The succession of these various operations brings the newly filled mould outside the cover lip 20 and within the zone for covering of the moulds 7 with the covers 21. These covers 21 provided for the purpose of preventing all inflation of the compressed material which might result from the subsequent production of gas, are supported by a counter chain 22 fitting onto the chain carrying the moulds and moving therewith in the latter's displacements.

The covers 21 are applied to the moulds 7 through the intermediary of rollers 23 guided by the rails 24 (Fig. 1), the whole of the rollers 23 being supported by the counter chain 22 which winds on the bosses 25. The covers 21 leave the moulds 7 only at the point where the removal from the mould takes place by the piston 14.

The disengagement of the compression device by the screw 3 during the change of the moulds 7 provides protection against all outward projections from the mould undergoing transfer, and avoids, at the other part, a considerable braking, the substance causing no push during this translatory movement. As above stated, the rotation is re-established only at the moment when a new empty mould has arrived, viz., when the chain carrying the mould is arrested.

The various parts of the machine serving for compressing hereinbefore described are assembled on a frame of profiled iron divided into three sections 36a, 36b, and 36c, the end sections 36a and 36c whereof carry the filling and emptying mechanisms for the moulds as well as the mechanism for driving the chains, said end sections being fixtures while the intermediate section 36b carrying none of the parts serving for the operation and carrying only the length of the chain and counter chain can be extended according to requirements of cooling and solidification which are variable with the nature of the combustibles being treated, the only modification necessary being, apart from the addition of a certain number of moulds and covers, the extension of the connecting rod 16 which drives the ratchet wheel 19.

The preceding description has been given solely for the clearer understanding of the characteristic features of the invention but it is obvious that all modifications in shape and details of construction can be included without exceeding the scope of the present invention.

What I claim, is:

1. In an apparatus for the agglomeration of powders of solid combustibles after semi-distillation of the latter up to their point of plasticity comprising a plurality of conical open end moulds, means for advancing and compressing the substance into said moulds, an endless chain supporting and moving said moulds, means to advance said chain intermittently to bring each of said moulds in turn to said compressing means, a plate for covering the small end of one of said conical moulds upon its turn at the compressing means, an ejecting means connected to said plate, and said endless chain connected with said plate and said ejecting means so that the three perform at the same moment to facilitate the coordination of parts of the apparatus.

2. In an apparatus for the agglomeration of powders of solid combustibles after semi-distillation of the latter up to their point of plasticity comprising a plurality of conical open end moulds, means for advancing and compressing the substance into said moulds, an endless chain supporting and moving said moulds, a plate for covering the small end of one of said conical moulds upon its turn at the compressing means, an ejecting means connected to said plate for removing the moulded substance from the moulds, and means controlling the movements of said endless chain, said plate and said ejecting means comprising a pneumatic motor, a drum to move said endless chain, a ratchet wheel to actuate said drum, a pawl to drive said ratchet wheel, a handle carrying said pawl and connected to said pneumatic motor and a pivoted arm having said plate and ejecting means connected thereto connected to said pneumatic motor thereby coordinating the movement of the parts of the apparatus.

3. In an apparatus for the agglomeration of powders of solid combustibles after semi-distillation of the latter up to their point of plasticity comprising a plurality of conical open end moulds, means for advancing and compressing the substance into said moulds, an endless chain supporting and moving said moulds, a plate for covering the small end of one of said conical moulds upon its turn at the compressing means, an ejecting means connected to said plate for removing the moulded substance from the moulds, and means controlling the movements of said endless chain, said plate and said ejecting means comprising a pneumatic motor, a drum to move said endless chain, a ratchet wheel to actuate said drum, a pawl to drive said ratchet wheel, a handle carrying said pawl and connected to said pneumatic motor and a pivoted arm having said plate, ejecting means connected thereto connected to said pneumatic motor and said pawl having an idle course thereby stopping said endless chain, releasing said plate applied against the lower side of said mould and causing said ejecting means to remove the moulded substance.

4. In an apparatus for the agglomeration of powders of solid combustibles after semi-distillation of the latter up to their point of plasticity comprising a plurality of conical open end moulds, means for advancing and compressing the substance into said moulds, an endless chain supporting and moving said moulds, means to advance said chain intermittently to bring each of said moulds in turn to said compressing means, a plate for covering the small end of one of said conical moulds upon its turn at the compressing means, an ejecting means connected to said plate, said endless chain connected with said plate and said ejecting means so that the three perform at the same moment to facilitate the coordination of parts of the apparatus and a frame to support the different parts of the apparatus comprising three sections, the end sections thereof supporting the working parts and said intermediate section carrying said endless chain and varying in length according to the requirements of cooling and solidification of the agglomerated combustibles.

5. In an apparatus for the agglomeration of powder of solid combustibles after semi-distillation of the latter up to their point of best plasticity, a plurality of conical open end moulds, means for advancing and compressing said substance into said moulds, an electric relay, means actuating said relay when the required pressure is obtained in said mould during loading thereof, and means controlled by said relay to ensure replacement of the loaded mould by an empty mould and the momentary stop of the compression device.

6. In an apparatus for the agglomeration of powders of solid combustibles after semi-distillation of the latter up to their point of plasticity comprising a plurality of conical open end moulds, means for advancing and compressing the substance into said moulds, an endless chain supporting and moving said moulds, means to advance said chain intermittently to bring each of said moulds in turn to said compressing means, a plate for covering the large end of several of said moulds when said moulds are in close proximity to said compressing means, a second chain connected to and actuated by said first chain, a plurality of plates carried by said second chain so arranged as to cover the large end of said moulds after charging from said cover plate to the point when said charge is unloaded, rollers for supporting the said two chains, guide rails having said rollers moving thereon so arranged as to give the correct spacing to the said plurality of plates in regard to said moulds, a plate for covering the small end of one of said conical moulds upon its turn at the compressing means, an ejecting means connected to said plate, and said first and second endless chains connected with said plate and said ejecting means so that the four perform at the same moment to facilitate the coordination of parts of the apparatus.

7. In an apparatus for the agglomeration of powders of solid combustibles after semi-distillation of the latter up to their point of plasticity comprising a plurality of conical open end moulds, an endless chain supporting and moving said moulds, means to advance said chain intermittently to bring each of said moulds in turn to said compressing means, means actuated by said endless chain for covering the large end of said moulds from the point of their charging to the point of discharging, a plate for covering the small end of one of said conical moulds upon its turn at the compressing means, an ejecting means connected to said plate, and said endless chain connected with said plate, said ejecting means and said covering means so that the four perform at the same moment to facilitate the coordination of parts of the apparatus.

GASTON VICTOR BRUYANT.